United States Patent [19]
Nomura

[11] 4,027,576
[45] June 7, 1977

[54] PUMP OR MOTOR HAVING SEALED CHAMBERS
[75] Inventor: Chifuru Nomura, Chino, Japan
[73] Assignee: Kitazawa Shoji Kabushiki Kaisha, Tokyo, Japan
[22] Filed: Nov. 5, 1975
[21] Appl. No.: 629,136
[30] Foreign Application Priority Data
Nov. 11, 1974 Japan ............... 49-136441[U]
[52] U.S. Cl. ............................. 91/339; 417/481; 92/122
[51] Int. Cl.² ................. F01C 9/00; F01B 15/06
[58] Field of Search ............... 92/122, 125; 91/339
[56] References Cited
UNITED STATES PATENTS

| | | | |
|---|---|---|---|
| 540,492 | 6/1895 | Humes | 92/122 |
| 1,444,577 | 2/1923 | Wilson | 92/122 |
| 2,561,858 | 7/1951 | Grawowski | 92/122 |
| 2,902,009 | 9/1959 | Ludwig | 92/125 |
| 2,966,144 | 12/1960 | Self | 92/125 |
| 3,155,019 | 11/1964 | Stiglie et al. | 92/122 |
| 3,327,592 | 6/1967 | Wilkinson | 92/122 |

Primary Examiner—William L. Freeh
Attorney, Agent, or Firm—Steinberg & Blake

[57] ABSTRACT

A pump or motor having a cylindrical housing member and a shaft member extending coaxially therethrough. The shaft member carries shaft vanes which project radially from the shaft member into close proximity with an inner cylindrical surface of the cylindrical housing member while the cylindrical housing member carries cylinder vanes which are fixed to the cylinder housing member and project therefrom radially toward and into close proximity with the shaft member. The ends of the shaft vanes are fixed with a pair of circular flanges which have outer peripheral edges next to the inner surface of the cylindrical member, these flanges extending across the opposed ends of the cylinder vanes. Axially extending sealing members extend along the outer edges of the shaft vanes between the latter and the inner surface of the cylinder member while annular sealing members extend along the peripheral edges of the flanges engaging the latter and the inner surface of the cylinder member. The cylinder vanes are each provided with a substantially U-shaped sealing member extending axially along the shaft member between the latter and each cylinder vane and also extending radially along the opposed ends of each cylinder vane between the latter and the flanges.

4 Claims, 3 Drawing Figures

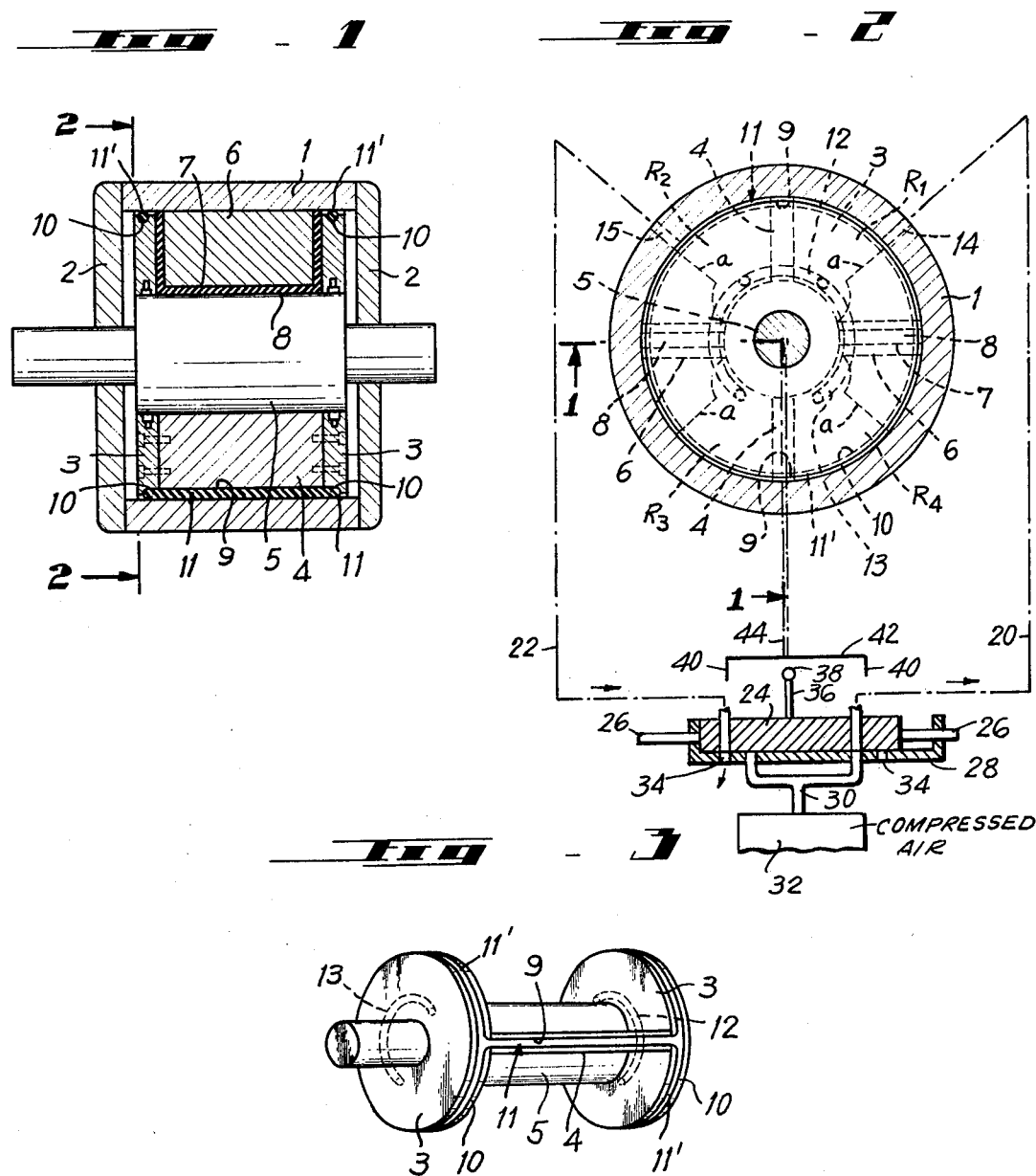

PUMP OR MOTOR HAVING SEALED CHAMBERS

BACKGROUND OF THE INVENTION

The present invention relates to pumps or motors.

Thus, in the case of a motor, an operating fluid under pressure is supplied in order to generate a rotary torque.

Conventional devices of this type include a cylindrical housing having opposed end walls which close the housing. Such a cylindrical housing will conventionally be stationary and will fixedly carry at its interior stationary vanes which extend inwardly from the inner surface of the cylindrical housing. A rotary shaft conventionally extends along the axis of the cylindrical housing and through the end walls which close the housing, such a rotary shaft fixedly carrying vanes which turn with the shaft.

Conventional structures of the above type have of necessity included relatively complex sealing structures which provide the necessary seals. However, because of difficulties encountered in obtaining the necessary seals, rotary actuators of the above type have rarely been used in practice even though basically the structure thereof is relatively simple. The problem encountered in conventional devices of this type with respect to achieving a good seal resides in the fact that it is difficult to achieve a satisfactory seal not only at the axially opposed ends of the movable vanes where the latter slide with respect to the end covers of the cylindrical housing but also at shoulders of the rotary shaft which are situated next to the end covers of the cylindrical housing.

SUMMARY OF THE INVENTION

It is accordingly a primary object of the present invention to provide a device of the above type wherein it is possible to achieve the required sealing in a simple effective manner.

In particular, it is an object of the present invention to provide a construction of the above general type which does not require any seals at the opposed ends of vanes which are connected to a rotary shaft and which also does not require seals at the shoulders of a rotary shaft which are situated next to the end wall covers of the cylindrical housing.

In particular, it is an object of the present invention to provide for a device of the above general type an extremely effective and at the same time simple sealing structure according to which it is possible to seal the individual chambers.

With the device of the present invention, when operating as a motor, there is an outer cylinder member which carries end walls, and within the cylinder member there is a rotor which includes a rotary shaft integrally carrying a pair of radially opposed movable vanes, which turn with the shaft, the latter also carrying circular flanges fixed to the ends of the movable vanes so that the flanges and vanes turn together with the shaft in the cylinder in the case where the latter is stationary and the shaft forms part of a rotor assembly.

In this example where the cylinder is stationary, there are radially opposed stationary vanes which project from the inner surface of the cylinder toward the rotary shaft so that the vanes carried by the latter move toward and away from the stationary vanes carried by the cylinder. The movable vanes which turn with the shaft carry at their outer edges next to the inner surface of the cylinder elongated axially extending seals and the flanges at the ends of the vanes carried by the shaft carry at their circular peripheries annular seals which are fixed with these axial seals so that a fluid-tight sliding engagement is provided between the rotor and the inner surface of the cylinder. The stationary vanes carry U-shaped seals extending along opposed ends of each stationary vane between the latter and the inner surfaces of the flanges which are directed toward each other with these U-shaped seals also having longitudinal portions extending between the stationary vanes and the shaft. In this way a slidable fluid-tight engagement is provided between the stationary vanes and the rotor. The pair of movable vanes and the pair of stationary vanes define between themselves four chambers distributed circumferentially about the shaft with each chamber being circumferentially limited on one side by a stationary vane and on the other side by a movable vane. Axially these chambers are limited by the pair of flanges which are fixed to the shaft as well as the opposed ends of the shaft vanes which turn with the shaft. Fluid under pressure can be delivered to a chamber on one side of a rotary vane while the chamber on the other side thereof communicates with fluid at a lesser pressure, and the above chambers on the opposite sides of the last-mentioned movable vane respectively communicate with diametrically opposed chambers, by way of suitable passages which are formed in the flanges.

Thus, according to the invention the elongated shaft member carries a shaft vane means fixed at its opposed ends to the circular flanges which are also carried by the shaft, and the cylindrical housing has an inner cylindrical surface directed toward the shaft and carrying the cylinder vanes which remain stationary with the cylindrical housing, the above seals providing for individual sealing of the several chambers and in particular the seals are achieved at the inner cylindrical surface of the cylinder housing. Each stationary vane which is fixed to the cylindrical housing has its own sealing surface with respect to the rotary shaft and the flanges which turn therewith, so that in this way a dynamic sealing surface is achieved as contrasted with static sealing surfaces established in the prior art between the housing and the end covers thereof. Thus with the invention the desired seals are achieved by way of the U-shaped sealing members between the vanes which are fixed to the cylinders and the surfaces of the shaft and flanges which cooperate with these cylinder vanes.

BRIEF DESCRIPTION OF DRAWINGS

The invention is illustrated by way of example in the accompanying drawings which form part of this application and in which:

FIG. 1 is a longitudinal sectional elevation of one embodiment of the invention, the section of FIG. 1 being taken along line 1—1 of FIG. 2 in the direction of the arrows;

FIG. 2 is a partly sectional transverse elevation of the structure of FIG. 1 taken along line 2—2 of FIG. 1 in the direction of the arrows, FIG. 2 in addition showing schematically how fluid is supplied to the structure; and FIG. 3 is a perspective illustration of the rotor of FIGS. 1 and 2.

DESCRIPTION OF PREFEFERRED EMBODIMENTS

The structure of the invention is described below with respect to an embodiment where the structure forms a motor to be driven by a fluid under pressure, although it will be apparent that the structure can also operate as a pump in the case where a suitable drive is connected to the structure.

Referring to FIGS. 1 and 2, there is illustrated therein an exterior cylinder member 1 forming an outer housing and carrying a pair of opposed end plates 2 which close off the interior of the cylinder member 1. Situated within the cylinder member 1 is a rotor which includes the rotor shaft member 5 having opposed end portions of reduced diameter extending through openings of the housing end walls 2, as is apparent from FIG. 1. Between these reduced diameter portions the shaft member 5 has an intermediate portion of a larger diameter extending between the walls 2 but terminating at a slight distance therefrom as illustrated in FIG. 1.

In addition to the shaft member 5, the rotor includes a pair of axially spaced flanges 3 of circular configuration which are fixed to the shaft 5 at the opposed ends of the interior enlarged diameter portion thereof, these flanges 3 being respectively situated in parallel planes which are normal to the axis of the shaft 5 as well as the coinciding axis of the cylinderm member 1, and the flanges 3 have outer peripheral edges which are circular and situated next to the inner cylindrical surface of the cylinder member 1, this inner cylindrical surface being of a circular cross section, as is apparent from FIG. 2. It will be noted that these flanges 3 are situated close to but at the same time are spaced from the end walls 2 of the cylindrical housing.

The shaft member 5 fixedly carries a shaft vane means which includes the axially extending vanes 4 which are fixed to the shaft 5, extending parallel to the axis thereof, with the pair of vanes 4 which are illustrated in FIG. 2 being situated in a common plane which contains the axis of the shaft 5. The axially extending vanes 4 are fixed in any suitable way to the shaft 5 and at their opposed ends are fixed directly with the flanges 3, each of the vanes 4 having a length equal to the axial distance between the flanges 3. The shaft vane means formed by the pair of vanes 4 has for each vane 4 an outer edge region situated next to the inner cylindrical surface of the cylinder member 1. The shaft 5 is suitably journaled with respect to the end plates 2 at the openings of the latter through which the reduced diameter elongated end portions of the shaft 5 extend.

The cylinder member 1 fixedly carries at its inner cylindrical surface a pair of diametrically opposed cylinder vanes 6 forming a cylinder vane means. Each of the cylinder vanes 6 projects from the inner surface of the cylinder member 1 toward the shaft 5. Moveover, each of the cylinder vanes 6 extends axially between the pair of opposed flanges 3 so that each of the cylinder vanes 6 has opposed ends next to the inner surfaces of the flanges 3 which are directed toward each other and an inner region extending axially along the shaft 5. As is apparent from FIG. 2, the cylinder vanes 6 and the shaft vanes 4 alternate with each other circumferentially around the shaft 5. Also as is apparent from FIG. 2, each of the cylinder vanes 6 has opposed side faces $a$ which are inclined and situated in predetermined radial planes which contain the axis of the shaft 5. The inclination of these faces $a$ of each cylinder vane 6 is such that as a shaft vane 4 approaches a surface $a$ the latter is substantially parallel to the vane 4 when the latter is situated closely adjacent to the particular face $a$.

In the above example it is assumed that the cylinder member 1 together with the vanes 6 are stationary while the shaft 5 rotates together with the flanges 3 and the vanes 4 fixed thereto, but of course it will be readily understood that this relationship can be reversed and the shaft 5 together with the flanges 3 and vanes 4 can be stationary while the cylinder 1 together with the cylinder vanes 6 can turn with respect to the shaft 5.

Each of the cylinder vanes 6 is formed with a groove 7 of substantially U-shaped configuration extending radially along one end surface of each vane 6, then axially along the surface thereof which is next to the shaft 5, and finally radially along the opposed end surface of each vane 6. A U-shaped sealing means takes the form of an elongated packing 8 which is situated in each groove 7 so as to be fixed with the particular vane 6, this sealing means 8 pressing against and frictionally engaging the opposed inner surfaces of the flanges 3, these being the surfaces which are directed toward each other and which are directed toward the opposed ends of each vane 6, while the elongated U-shaped sealing means 8 at each vane 6 has between the portions at the end faces of each vane 6 an elongated axially extending portion which presses against and frictionally engages the exterior surface of the shaft 5. One of the U-shaped sealing means 8 is illustrated in FIG. 1 above the shaft 5.

On the other hand, the shaft vanes 4 have at their outer longitudinal edges elongated axially extending grooves 9, respectively, and these grooves 9 communicate at their opposed ends with annular grooves 10 which are formed at the outer peripheral edges of the flanges 3. The grooves 9 receive elongated axial sealing means 11 in the form of elongagted sealing members extending longitudinally along the interiors of the grooves 9 and pressing against and frictionally engaging the inner surface of the cylinder member 1, while annular sealing means 11' occupy the annular grooves 10 and also press against and frictionally engage the inner surface of the cylinder member 1. The axial seal members 11 and annular seal members 11' are integral with each other so that they form one continuous sealing structure situated at the outer peripheral edges of the vanes 4 and flanges 3, achieving this way a slidable fluid-tight engagement between the vanes 4 and flanges 3, on the one hand, and the inner surface of the cylinder 1 on the other hand.

It will be seen that with this construction the several shaft and cylinder vanes define between themselves chambers $R_1$, $R_2$, $R_3$, and $R_4$ which are distributed circumferentially about the shaft 1 and which are limited axially by the flanges 3.

As is apparent from FIG. 3, the flanges 3 illustrated therein are respectively formed with passages 12 and 13 each extending approximately through 180° around the axis of the shaft 5, and having opposed open ends situated at the inner surface of each flange 3. As is apparent from FIG. 2, the passage 12 maintains the diametrically opposed chambers $R_1$ and $R_3$ in constant communication with each other, while the passage 13 maintains the diametrically opposed chambers $R_2$ and $R_4$ in constant communication with each other.

In addition, the cylinder member 1 is provided with a means for placing the chambers $R_1$ and $R_2$, situated on the opposite circumferential sides of the upper vane 4 of FIG. 2, alternately in communication with a source of fluid under pressure, with the arrangement being such that whichever one of these chambers $R_1$ and $R_2$ communicates with the source of fluid under pressure, the other chamber simultaneously is at a lesser pressure. For this purpose the cylinder 1 which is stationary in the illustrated example is provided along the upper face a of the right cylinder vane 6 with an opening 14 through which fluid under pressure may flow into the chamber $R_1$ while when the chamber $R_2$ receives fluid under pressure, fluid can escape from the chamber $R_1$ through the opening 14. In the same way, the cylinder 1 is provided with an opening 15 situated along the upper surface a of the left vane 6 of FIG. 2, and through this opening 15 the chamber $R_2$ can be placed in communication with a source of fluid under pressure, when the chamber $R_1$ is at a lesser pressure, and when the chamber $R_1$ receives fluid under pressure, the chamber $R_2$ is placed through the passage 15 at a lesser pressure.

In the particular example illustrated the fluid is compressed air so that each of the openings 14 and 15 form an air channel serving alternately as an inlet for air under pressure and as a discharge for the air.

As is shown schematically in FIG. 2, it is possible to place flexible tubes 20 and 22 in communication with the openings 14 and 15, these tubes 20 and 22 also being connected with openings which pass through a shiftable valve member 24. The valve member 24 has opposed ends 26 which serve to guide the valve member for movement to the right and left in a suitable valve housing 28 formed with a pair of openings communicating through the Y-connection 30 with a tank 32 which contains compressed air at all times. Of course through a suitable compressor and valve the pressure of the air in the tank 32 will be maintained at a certain value. The wall of the housing 28 which is connected with the Y-connection 30 is also provided with a pair of vents 34 communicating with the outer atmosphere. The valve member 24 fixedly carries an extension 36 having an outer end 38 situated in the path of movement of a pair of projections 40 which are fixed to a rod 42 which in turn is fixed to the outer end of an elongated arm 44 fixed in any suitable way to the shaft 5 at the exterior of the housing 1 so that the arm 44 turns with the shaft 5.

In the position of the parts shown in FIG. 2 the valve 24 has previously been shifted to the left so that the opening 15 communicates with the left vent 34 while the opening 14 communicates with the right arm of the Y-connection 30. Thus at this time the compressed air is flowing into the chamber $R_1$ and of course through the passage 12 into the chamber $R_3$. At the same time the chamber $R_2$, and the chamber $R_4$ which communicates through the passage 13 therewith, communicate with the outer atmosphere through the tube 22 and the left vent 34 of FIG. 2. Thus, in the above example where the housing 1 is stationary, with the parts as shown in FIG. 2, the shaft 5 is turning together with the vanes 4 and the flanges 3 in a counterclockwise direction with respect to the stationary housing 1 and the stationary vanes 6, and thus the left projection 40 is approaching the outer end 38 of the arm 36. Just before the upper and lower vanes 4 reach the upper surface of the left vane 6 and the lower surface of the right vane 6 of FIG. 2 the left projection 40 engages the outer end 38 of the arm 36 and shifts the valve 24 to the right, so that now the compressed air from the tank 32 flows through the pipe 22 into the chamber $R_2$, and of course through the passage 13 into the chamber $R_4$, while at the same time the chambers $R_1$ and $R_3$ are placed in communication with the outer atmosphere through the right vent 34 of FIG. 2. Of course the direction of rotation of the rotor will now be reversed and a clockwise turning, as viewed in FIG. 2 will be provided until the right projection 40 shown in FIG. 2 engages the outer end 38 of the arm 36 and shifts the valve 24 back to the position shown in FIG. 2.

Thus, as will be apparent from the above description, air at relatively high pressure, when utilized as an operating fluid, is introduced through the channel 14 into the chamber $R_1$ while the other channel 15 is in communication with the outer atmosphere at a pressure lower than the pressure of the fluid supplied to the chamber $R_1$. This differential in the pressure on the opposed sides of each vane 4 will of course generate the rotary torque while the several chambers are sealed from each other by way of the above-described sealing structure. The direction of rotation is reversed when as described above the air under pressure is introduced into the chambers $R_2$ and $R_4$ while the chambers $R_1$ and $R_3$ are vented to the outer atmosphere.

The packings which form the sealing means of the invention are sufficiently elastic to maintain the required slidable engagement in a perfectly air-tight manner.

As pointed out above, with the novel structure of the invention the linear grooves and the annular grooves 10 are respectively formed along the outer edges of the vanes 4 and flanges 3 while the sealing means includes the axial portions 11 in the grooves 9 and the circular portions 11' in the grooves 10 with these sealing components 11 and 11' being integral with each other. On the other hand, each of the stationary vanes 6 has the U-shaped sealing means providing the required seal axially along the exterior surface of the shaft 5 and radially along the inner surfaces of the flanges 3 at the opposed ends of each vane 6. In this way the relatively difficult sealing problem encountered with conventional structures is avoided with the required sealing being achieved to a great extent at the inner cylindrical surface of the cylinder member 1 and the remaining sealing effect being achieved by the U-shaped sealing members between the vanes 6 and the inner surfaces of the flanges 3 and the outer surface of the shaft 5. Thus a rotary actuator which is highly reliable and capable of operating positively is achieved.

Of course, variations are possible in the above-described structure. For example, instead of air an operating fluid in the form of a suitable liquid can be provided. Thus a pump may pump liquid at a desired pressure alternately into the chambers $R_1$ and $R_2$ as described above in connection with air, and the chambers which at any given instant are at a lower pressure can discharge the liquid to a tank from which the pump sucks the liquid, so that the liquid is continuously recirculated through the assembly by such a pump.

Furthermore, it is clear that irrespective of whether the fluid is a gas or liquid, it is possible to maintain the shaft 5 and the vanes 4 and flanges 3 stationary while the cylindrical housing 1 together with the vanes 6 rotate with respect to the stationary shaft 5. Moreover, if the shaft 5 is connected to a suitable oscillating drive which angularly oscillates the shaft 5 back and forth, the structure can operate as a pump, with each chamber sucking a fluid into its interior while its volume expands and with the fluid being discharged under pressure from the chambers which at any given instant have their volumes reduced. Any suitable crank drive may be connected to the shaft 5 in order to angularly oscillate the latter back and forth for such a purpose.

In the case where the device operates as described above as a motor, an oscillating drive can be taken off directly from the shaft 5 while if a one-direction drive is desired, it is possible through suitable gears and one-way driving clutches and the like to achieve a one-way drive in a manner well known in the art. Furthermore, it is clear that the invention need not necessarily include two vanes 4 and two vanes 6. The number of stationary and rotary vanes may be increased as desired, and of course it is also possible to operate with only a single vane 4 and a single vane 6. Of course in this latter event the angle through which the rotor turns would be much greater and the passages 12 and 13 would not be required. However, a structure as illustrated is preferred because the forces are balanced.

What is claimed is:

1. In a device, such as a pump or motor, for operating with a fluid under pressure, an elongated shaft member having a longitudinal axis and an elongated cylinder member coaxially surrounding said shaft member and having an inner cylindrical surface of circular cross section directed toward said shaft member, elongated shaft vane means fixed to and extending longitudinally along said shaft member parallel to said axis thereof, said shaft vane means projecting radially from said shaft member toward said cylinder member and having an outer edge region situated next to said inner cylindrical surface of said cylinder member, said shaft vane means having opposed ends and said shaft member carrying at said opposed ends of said shaft vane means a pair of circular flanges which are respectively situated in planes normal to said axis, which extend from said shaft member toward said cylinder member, and which have outer circular edge regions next to said inner cylindrical surface of said cylinder member, said flanges being fixed to said opposed ends of said shaft vane means, axial sealing means extending along said outer edge region of said shaft vane means between the latter and said inner cylindrical surface of said cylinder member and annular sealing means extending along said outer edge regions of said flanges and situated between the latter and said inner surface of said cylinder member, said axial and annular sealing means being joined to each other and providing for slidable fluid-tight engagement between said inner cylinder surface of said cylinder member and said outer edge regions of said shaft vane means and circular flanges, cylinder vane means also extending parallel to said axis, said cylinder vane means being fixed to said cylinder member and extending from said inner surface thereof toward said shaft member, said cylinder vane means being situated between said flanges and having opposed ends respectively adjacent said flanges, and said cylinder vane means having an inner region situated next to said shaft member, so that said cylinder vane means and shaft vane means define between themselves chambers extending longitudinally between said flanges and circumferentially between said cylinder and shaft vane means, and substantially U-shaped sealing means extending longitudinally along said inner region of said cylinder vane means between the latter and said shaft member and along the opposed ends of said cylinder vane means between the latter and said flanges for providing a slidable fluid-tight engagement between said cylinder vane means on the one hand and said flanges and shaft member on the other hand, so that when the device operates as a motor and fluid under pressure is supplied to a chamber situated circumferentially on one side of said shaft vane means between the latter and said cylinder vane means while the chamber which is circumferentially on the other side of said shaft vane means is at a pressure lower than the pressure of said fluid, one of said members will be driven in rotation with respect to the other in one angular direction, while when fluid under pressure is supplied to the chamber at said other side of said shaft vane means between the latter and said cylinder vane means while the chamber on said one side of said shaft vane means is at a pressure less than the pressure of the fluid, said one member will be driven in rotation in an opposite angular direction with respect to the other member, all of said vanes defining between themselves four chambers distributed circumferentially between said vanes about said axis, said cylinder member having means for placing a pair of said chambers which are respectively situated on opposite sides of said one shaft vane alternately in communication with a source of fluid under pressure, one of said flanges being formed with a passage means placing one of said chambers on one side of said one shaft vane in communication with a diametrically opposed chamber and the other of said flanges carrying a passage means placing the other of said chambers on the other side of said one shaft vane in communication with the chamber diametrically opposed to said chamber on said other side of said one shaft vane.

2. The combination of claim 1 and wherein said cylinder member is stationary while said shaft member together with said shaft vanes and flanges turn first in one angular direction and then in an opposite angular direction with respect to said cylinder member, said cylinder vanes remaining stationary with said cylinder member.

3. The combination of claim 1 and wherein said cylinder member fixedly carries a pair of opposed end walls which extend parallel to and are spaced from said flanges, said end walls being formed with openings through which said shaft member extends to the exterior of said cylinder member.

4. The combination of claim 1 and wherein each cylinder vane has opposed longitudinal side faces respectively situated in radial planes which contain said axis and respectively having inclinations which are substantially parallel to said shaft vanes when the latter are situated in close proximity to said side faces of said cylinder vanes.

* * * * *